United States Patent Office 2,852,487
Patented Sept. 16, 1958

2,852,487

POLYMERIZABLE SOLUTION OF AN ALLYL ETHER AND AN UNSATURATED ALKYD RESIN

Walter J. Maker, La Grange, Ill., assignor to The Glidden Company, Cleveland, Ohio, a corporation of Ohio No Drawing. Application August 5, 1955
Serial No. 526,776

2 Claims. (Cl. 260—45.4)

This invention relates to new materials having valuable and characteristic properties which make them especially suitable for use in industry, for example, in molding, laminating, impregnating, casting, coatings, adhesives, and in other operations and products. The invention is also concerned with methods for preparing reaction products and/or interpolymers of the following components: (A) at least one modified or unmodified "dihydric" alcohol polyester resin of an alpha unsaturated alpha, beta "dicarboxylic" acid, which polyester resins are designated generally hereinafter for purposes of brevity as "unsaturated alkyd resin," with (B) at least one alpha allyl ether compound corresponding to the following general formula:

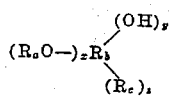

where $R_aO$ is an alpha allyl ether group having the structure $CH_2=CHCH_2O-$ or is a substituted $\alpha$-allyl ether group having up to 6 carbons with all carbons in excess of 3 therein being attached directly or chainwise to $\alpha$ and/or $\beta$ carbons of the allyl group; that is, $R_aO$ (hereinafter described for convenience as an allylic ether group) is the residue of an alkenyl alcohol wherein the alkenyl radical thereof contains not more than 6 carbon atoms and has an olefinic linkage between the beta and gamma carbon atoms, the gamma carbon atom being part of a terminal methylene group and the beta carbon atom being linked directly to a carbon atom having an ethereal oxygen atom linked directly thereto; where $R_b$ is a saturated organic radical having a valency V between 2 and 6, inclusive, and is selected from the group consisting of (1) aliphatic hydrocarbon radicals of 2 to 6 carbons, inclusive, and (2) radicals consisting of series of saturated aliphatic hydrocarbon groups linked through oxygen, each hydrocarbon group containing at least two carbon atoms and the sum of the carbon and oxygen atoms in the entire radical being from 5 to 80; where $R_c$ is a saturated aliphatic, saturated cycloaliphatic, aromatic or aryl acyloxy radical of from 2 to 18 carbon atoms; where $x$ is an integer between 1 and V, inclusive; where $y$ is a whole number between 0 and 2, inclusive; and where $z$ is a whole number between 0 and $$V-(x+y)$$

inclusive; and with or without (C) an organic unsaturated monomer possessing an ethylenic group $CH_2=C<$, such as vinyl, acrylic and/or allyl groups, said B component in some instances, and said C component, when present, serving as solvent for the unsaturated alkyd resin. According to one embodiment of the invention, the A component is internally modified chemically with the B component.

The foregoing terms "dihydric" alcohol(s) and "dicarboxylic" acid(s) are there and hereinafter used to identify, respectively, alcohols and acids which are either actually or effectively difunctional. Alcohols and acids which are "effectively" difunctional are explained and described fully hereinafter.

Solvent-free compositions containing an unsaturated alkyd resin dissolved in one or more ethylenic monomers have been prepared and used in the past, but have been subject to the fault of curing to a mass having a tacky or soft surface when cured while exposed to air. This fault has seriously limited the use of such compositions, especially in coatings and other compositions where curing is desirably accomplished in air. As pointed out in the Pechukas et al. U. S. Patent No. 2,420,740, numerous polyester (unsaturated alkyd resin) compositions cannot be satisfactorily cured while exposed to oxygen unless the exposed surface is protected. That patent describes the use of a film of polyvinyl alcohol or other water-soluble material as a protective coating on the exposed surface of the hardened but uncured polyester. After curing of the polyester has been effected, the protecting sheet is peeled off, or dissolved away. It is evident that the application and use of such a protective film adds considerably to the cost, both in material and labor, of effectively curing such oxygen-sensitive resinous masses. Other expedients have also been proposed or used to overcome the tackiness, but none of them has been entirely satisfactory commercially.

I have now found that the oxygen-sensitivity and resulting tackiness of exposed surfaces of such masses can be effectively overcome by incorporating in the mass prior to curing a suitable amount of at least one alpha allyl ether compound as defined generally hereinabove and exemplified particularly hereinafter. By providing such ether groups in the resinous mass, the exposed surfaces of the mass no longer need any sort of external protection and can be cured in air in conventional baking ovens or elsewhere to dense, solid masses without exhibiting tackiness or softness at the exposed surfaces thereof. It will be readily understood that the present invention markedly improves such resinous masses for such uses as coating compositions, casting and potting compounds, as impregnants, as laminants, and as the vehicle in putties and caulking compounds; that is, for any use wherein the resinous mass is desirably cured while exposed to air or oxygen. My improved compositions are also useful in a variety of operations such as cementing and molding, where the mass is cured while essentially out of contact with oxygen.

Accordingly, it will be understood that the main object of my invention is to provide new compositions of matter and particularly to provide a solvent-free, 100%-polymerizable, unsaturated-alkyd-resin-containing composition of improved characteristics which can be cured while exposed to air or oxygen without exhibiting any under- or uncured tacky exposed surfaces.

Other objects ancillary thereto will be apparent from the following detailed description of my invention.

As mentioned above, my 100%-polymerizable compositions are prepared from at least the first two of the following three classes of materials:

(A) A polymerizable unsaturated alkyd resin component obtained by esterification of a "dihydric" alcohol with an alpha unsaturated alpha, beta "dicarboxylic" acid and with or without a saturated aliphatic or aromtic "dicarboxylic" acid;

(B) An allylic ether component composed of one or more alpha allylic ether compounds corresponding to the general formula set forth above, some, all or none of which is chemically combined by esterification with the unsaturated alkyd resin component; and (C) An ethylenic monomer component capable of undergoing reaction and polymerization with at least the unsaturated alkyd resin while also functioning as solvent for the alkyd resin component and for such of the allylic ether component which is not chemically combined with the unsaturated alkyd resin component.

These three classes of materials will now be discussed under their separate headings.

THE UNSATURATED ALKYD RESIN COMPONENT

This component may be prepared apart from the other components, and subsequently dissolved in the allylic ether component, or in a mixture of the allylic ether component with the ethylenic monomer component. Alternatively, the alkyd may be prepared by using monohydric and/or "dihydric" allylic ether derivatives of polyhydric alcohols as ingredients in the formulation of the alkyd, in which case allylic ether groups become substituents of carbon atoms which form the chain of the unsaturated alkyd resin. Mixtures of components prepared by both alternative procedures are also contemplated. Whether prepared with or without the allylic ether compound(s), the preparation of the unsaturated alkyd resin involves esterifying alpha unsaturated alpha, beta "dicarboxylic" acid(s) with "dihydric" alcohol(s). Examples of suitable actual dicarboxylic acids are maleic, monohalomaleic, fumaric, monohalofumaric, carbic (endomethylene-$\Delta^4$-tetrahydrophthalic), citraconic, ethylmaleic, mesaconic, acetylene dicarboxylic, aconitic, itaconic and homologues of the latter, as, for instance, alpha-methyl itaconic acid, alpha-alpha-dimethyl-itaconic acid, etc. If available, anhydrides of these dicarboxylic acids can be used. Examples of suitable actual dihydric alcohols are ethylene glycol, di-, tri-, tetra-, penta-, hexa-, hepta-, and higher-ethylene glycols, 1,2-propylene glycol, 1,3-dipropanediol, trimethylene glycol, polypropylene glycols, butylene glycols, thiodiglycol, halogen substituted glycols, etc. The prior art abounds with these and other examples.

In many instances, instead of preparing and using an unmodified unsaturated alkyd resin, I can prepare and use an unsaturated alkyd resin which has been internally modified by replacing a part of the unsaturated dicarboxylic acid with saturated aliphatic dicarboxylic acids, such as succinic, adipic, glutaric, pimelic, sebacic, azelaic, suberic, etc., and/or with aromatic dicarboxylic acids, e. g. phthalic, tetrachlorophthalic, benzoyl phthalic, terephthalic, benzophenone dicarboxylic, etc. Such aromatic acids may be considered as being saturated or non-ethylenic dicarboxylic acids, since the double bonds of the aromatic nuclei do not react by addition as do ethylenic groups. Anhydrides of any of these saturated acids, if available, can also be used. Mixtures of acids and/or anhydrides are also contemplated.

The term "dicarboxylic" acid as used generally herein is intended to include within its meaning the anhydrides of the acids where the anhydrides are capable of existence.

In the foregoing description of the unsaturated "dicarboxylic" acids and "dihydric" alcohols, only the actual difunctional compounds have been referred to, since fundamentally these compounds represent the simplest materials which I contemplate in preferred embodiments of my invention. By confining the alkyd resin to "dicarboxylic" acids and to "dihydric" alcohols in accordance with my preference, the resulting polymers of the alkyd resin are most apt to be linear in configuration. Linear polymers are preferred since their molecular weight can be increased to appropriate values during their preparation without having much cross-linking occur. The cross-linking through double-bond addition reactions can thereby be reserved largely to the curing operation, so as to utilize the allylic ether linkages effectively. It should be understood, however, that my preference for linear polymers in the unsaturated alkyd resin component does not exclude the use of cross-linked polymers and particularly does not prevent the use of materials which are fundamentally poly-functional, as next explained.

For instance, glycerine, pentaerythritol, sorbitol and other higher polyalcohols can be used if they are esterified, etherified or otherwise modified to present only two esterifiable hydroxyls for reaction with the "dicarboxylic" acids. Similarly, a trifunctional acid, such as tricarballylic acid can be reduced functionally to the dicarboxylic level by esterifying one carboxyl with a monohydric alcohol. Polyhydric alcohols and polycarboxylic acids which have thus been modified are herein referred to as acids and alcohols which are effective "dicarboxylic" acids and effective "dihydric" alcohols, respectively. As indicated previously, the use of such effective difunctional acids and alcohols in the present invention with or without actual difunctional acids and/or alcohols is contemplated. Accordingly, it will be understood that the esterification products of actual and/or effective "dihydric" alcohols with unsaturated actual and/or effective "dicarboxylic" acids (with or without saturated aliphatic and/or aromatic actual and/or effective "dicarboxylic" acids) may be further modified by introducing as a reactant in the preparation of the alkyd resin component one or more mono-esterifiable compounds, more particularly one or more saturated normal or isomeric monohydric alcohols, or one or more saturated monocarboxylic acids, or mixtures of such esterifiable monohydric alcohols with monocarboxylic acids. Such compounds can be used not only to effect reduction of tri- and more highly-functional ingredients of the alkyd to the "difunctional" level, as explained above, but can also be used in manners well known to those skilled in the art, as for instance, the monohydric alcohols can be used to reduce the acid number of the unsaturated alkyd resin, or the monocarboxylic acids can be used to reduce the acetyl value of the unsaturated alkyd resin. The amounts of such monofunctional materials which are used should, of course, be such as to be wholly combined chemically by esterification into the resin. Uncombined materials should be removed before the resin is subjected to curing if the advantages of 100%-polymerizable compositions are to be fully realized.

Examples of saturated monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, and higher monohydric alcohols. The use of methyl and ethyl alcohols is not precluded, but in general these alcohols are less satisfactory because of their lower boiling points. Monocarboxylic acids which can be used are, for example, normal and/or isomeric saturated monocarboxylic acids containing only one esterifiable group; e. g., acetic, propionic, butyric to stearic, inclusive, and benzoic acids. The monoesterifiable compound(s) can be introduced into the reactive mass before, during or after the esterification of the actual and/or effective "dihydric" alcohols with the actual and/or effective "dicarboxylic" acids under conditions such that esterification of the monoesterifiable compound with the incompletely formed alkyd resin component is attained. That is, the mono-esterifiable compound must be introduced into the reaction mass before all of the acid groups or all of the alcohol groups of the ingredients of the alkyd resin have been esterified, as previously pointed out.

In the preparation of the unsaturated alkyd resin component, the amount of "dihydric" alcohol plus any monohydric alcohol is generally chosen to give approximate molar equivalency, or a slight excess over such equivalency, as to the sum of the ethylenic "dicarboxylic" acids plus any non-ethylenic "dicarboxylic" acid plus any monocarboxylic acid. Usually the excess over equivalency will not exceed about 10% to 20%, and it may be lower. The excess facilitates reduction of the acid number of the resulting unsaturated alkyd resin. As mentioned previously, the alpha, beta unsaturated "dicarboxylic" acid(s) may constitute the whole of the acid component of the alkyd resin, but usually it is preferable to include at least some of one or more of the saturated aliphatic and/or aromatic "dicarboxylic" acids. The amount of the latter is capable of variation over a broad range. The minimum is, of course, none at all and the maximum can be about 9 mols thereof per mol of the unsaturated "dicarboxylic" acid. As the percentage of saturated acid is reduced, the product assumes more and more closely the character of the unsaturated alkyd resin. It is impossible to state an absolute minimum for the effective amount of saturated acid which will produce significant change in character or properties of the resin since the amount of change which constitutes a significant change depends somewhat on the amount and kind of acid used, on the amount and kind of allylic ether component which is used, on the amount and kind (if any) of ethylenically-unsaturated monomer used, and on the ultimate intended use of the finished whole composition. Amounts at least as low as ⅓ mol of saturated aliphatic and/or aromatic "dicarboxylic" acid per mol of unsaturated "dicarboxylic" acid are suggested simply for guidance. When monocarboxylic acid is included in the formulation of the alkyd resin, a range of from one mol thereof per two to ten mols of total "dicarboxylic" acid is suggested on the same basis. Approximately the same proportions of monohydric alcohol to "dihydric" alcohol can be used.

In conducting the esterification of the total alcohol content of the unsaturated alkyd resin, conventional principles are adhered to. Acid catalysts may be added. The reaction should be conducted under a protective, non-oxidizing atmosphere, such as an atmosphere of carbon dioxide or nitrogen gas. Xylene or other non-reactive solvent can be included and the reaction can be conducted by heating the mixture to reaction temperature, e. g., to that at which water is expelled from the system. It is continued until water ceases to be evolved and until the acid value of a sample is reasonably low, e. g., 5 to 50. It should not be continued so long as to result in infusibility of the mass or to give linear polymers of such high molecular weight as will prevent the finished compositions of the invention from becoming homogeneous, single-phase cured masses at least at an appropriate curing temperature. Usually a temperature of 135° to 200° C. and a reaction time of 2 to 20 hours is sufficient to effect the esterification. After the desired acid value has been reached directly or by subsequent addition of "monohydric" alcohol, the azeotropic medium and any unreacted materials are distilled off. The resulting mass is then cooled somewhat to a safe temperature, and any gelation inhibitors are added. Ethylenic monomer(s), if desired, can then be added to dissolve the mass, and/or any allylic ether compounds which are to be included as solvent can also be added.

Where can or tank stability beyond that inherent in the compositions is needed, conventional inhibitors can be included. As indicated in U. S. Patent No. 2,453,665, suitable polymerization inhibitors include hydroquinone, benzaldehyde, ascorbic acid, resorcinol, catechol, t-butyl catechol, sym. di, beta naphthyl p-phenylene diamine and phenolic resins. Others are also known to the art, e. g., those described in U. S. Patent 2,593,787.

THE ALLYLIC ETHER COMPONENT

As indicated above, the allylic ether component should correspond to the general formula set forth above. Examples of suitable ethers are: α-allyl ether of glycerine ($CH_2$=$CHCH_2$—O—$CHOHCH_2OH$); 1,2,3-triallyl ether of propane

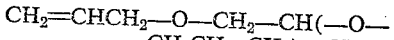

mono α-allyl ethers of any glycol or of any other aliphatic actual or effective dihydric alcohol, the mono- di- and/or tri-α-allyl ethers of any saturated aliphatic trihydric alcohol (e. g., glycerine); the di-, tri and/or tetra-α-allyl ethers of pentaerythritol, the tetra-, penta- and/or hexa-α-allyl ethers of sorbitol or mannitol and corresponding α-allyl ethers of other polyhydric alcohols having up to 6 hydroxyls. Substituted α-allylic ether groups of up to 6 carbons can also be used, provided the substituents are attached to the α and/or β carbons of the alpha allyl group, e. g., methallyl, dimethyl allyl, ethallyl, propallyl, etc. Esters of such of the foregoing compounds as contain esterifiable hydroxyl groups can also be used, as can mixtures of any of the compounds herein mentioned and of any of the compounds encompassed by the general formula set forth above.

The incorporation of the α-allylic ether component into the finished composition can be accomplished in two ways, as mentioned previously. The ether component can be used by itself as solvent for the alkyd resin component alone or can be dissolved along with the alkyd resin component in any ethylenically-unsaturated monomer which is to be conjointly polymerized with those components. In either instance, the allylic ether component should preferably undergo no reactions during curing other than autoxidation and 1,2 addition through unsaturation. When the ether component contains one or two reactive hydroxyl groups, it can be combined chemically with the alkyd resin by counting its hydroxyls as part of the total hydroxyls which are to be esterified when preparing the alkyd resin component; that is, such hydroxylated ether compounds can replace an equivalent amount of monohydric and/or "dihydric" alcohol which respectively might otherwise be used in preparing the alkyd resin component.

The amount of allylic ether component which is needed to overcome the cure-inhibiting effects of oxygen and air depends to some extent on the formulation of the alkyd resin component which is being cured, on the amount of ethylenically-unsaturated monomer component present (if any) and on the nature of the allylic ether compound employed. Small amounts of allylic ether component expressed in molar percentage on the amount of unsaturated "dicarboxylic" acid present in the alkyd resin component have been observed to afford noticeable reduction in surface tack, while larger amounts, on the same basis, afford further improvement or completely overcome the inhibiting effects. Thus, the smallest amount needed in a particular formulation is best determined by trial, due regard being given to the latitude which the particular formulation affords. For purposes of guidance, however, as little as 1 allylic grouping per 50 double bonds in the unsaturated "dicarboxylic" acid of the alkyd resin has been found to be effective, while as many as 2 allylic groupings per double bond in the "dicarboxylic" acid also have been used. The following examples illustrate various proportions between the foregoing limits.

It should be noted that in accordance with the general formula set forth hereinabove, my alpha-allylic ether component, when present as a solvent rather than being chemically combined with the alkyd resin component, may have functionality other than in the allylic ether groupings, e. g., through hydroxyl groups. When the allylic ether solvent component contains such free hydroxyl groups, I contemplate that such groups will be converted during curing into stable linkages and after curing will no longer exist as potentially-reactive or free hydroxyls. Those skilled in the art will recognize that conversion of such hydroxyls can be accomplished in various ways, as by curing the allylic ether component with an unsaturated alkyd resin of appropriate acid number. Such reactions can be utilized when the liberation of water during curing is not harmful to the finished product.

THE ETHYLENICALLY-UNSATURATED COMPONENT

The ethylenically-unsaturated monomers which are useful comprise any of the common ethylenically-unsaturated compounds capable of cross linking unsaturated alkyd resin molecules at their points of unsaturation to give homogeneous single phase cured masses. Usually they contain the reactive group $H_2C=C<$. The unsaturated alkyd resins and the ethylenically-unsaturated monomers are mutually soluble at room temperature, or at elevated temperatures such as are used in curing. The ethylenically-unsaturated component is usually a liquid, polymerizable compound; however, polymerizable resins or crystalline monomers which are mutually soluble with the alkyd resin component at curing temperatures can also be used to prepare mixtures employed in curing. Some suitable monomeric materials are as follows: styrene; α-methyl styrene; p-methyl styrene; divinyl benzene; indene; and unsaturated esters such as: vinyl acetate; methyl methacrylate; methylacrylate; allyl acetate; diallyl phthalate; diallyl succinate; diallyl adipate; diallyl sebacate; diethylene glycol bis (allyl carbonate); triallyl phosphate; and vinyl chloride. Homogeneous cured products resulting from mixtures of any one or of two or more of the foregoing ethylenically-unsaturated compounds with the alkyd resin(s) are contemplated.

The ethylenically-unsaturated component, when used, should usually constitute up to about 70% by weight of the whole polymerizable mixture, and mixtures containing from about 20% to 40 or 50% of ethylenically-unsaturated component by weight on the interpolymer are to be preferred. The appropriate, selected amount is added to the unsaturated alkyd resin component at temperatures of about 120° C. or lower.

CURING THE COPOLYMERIZABLE COMPOSITION

The mixture obtained by dissolving together the polyester, the alpha allylic ether (where all of such component is not already combined chemically in the polyester), with or without the ethylenically-unsaturated component and with or without appropriate stabilizers, is preferably cured by incorporating suitable well-known and/or conventional curing catalyst(s) in amounts between about .1% to 5% by weight, with or without metallic driers, and baking the resulting mass at temperatures up to about 150° C. with or without the application of pressure. Higher temperatures can also be used, but they should not be high enough to volatilize any of the ingredients in the initial stages of curing, nor to char or discolor the final product. The time of curing and baking, of course, will vary greatly depending upon such factors as the size and thickness of the body to be formed and the temperature of reaction. Usually 5 minutes to 2 hours is sufficient. However, it is easy to determine by hardness tests when the articles are cured to hard state.

The compositions of my invention can be converted to resinous copolymer or interpolymer masses either in a clear unpigmented state or in the presence of fillers, dyes, pigments, opacifiers, lubricants, plasticizers or other modifying agents in, for example, casting, molding and laminating applications, and as adhesives, impregnants and surface-coating compositions.

As modifying agents, various fillers may be used, for example wood flour, alpha celulose in flock form, sand, powdered or flaked mica, cellulosic materials such as cellulose itself, regenerated cellulose, cellulose ethers, sheets or cuttings of paper, cloth, canvas, etc., asbestos in powdered, long or short fiber length, short or long wood fibers, synthetic or natural continuous thread fibers, glass fibers in continuous filament or fabric (woven or felted) form, etc.

Most of the common pigments can be used with the compositions of my invention, but a few pigments have been found to retard or delay curing. The copper-containing blue pigments and cadmium reds are of this type. The ultramarine blues do not delay curing and can be used freely. Typical pigments which I have found to be useful are anatase, ultramine blue, barium sulfate, magnesium silicate, antimony oxide, chrome yellow, molybdate orange, cadmium reds, chrome greens, burnt umber and carbon black. Those skilled in the art will recognize many other pigments that can be tried and used if their inhibiting effects are not objectionable.

My compositions can be used as impregnants for many porous bodies, such as cork, pottery, porous metal parts as castings and sintered briquettes, felts or fabricated bodies with interstices, such as the windings of electrical coils, netted fibers, interwoven fibrous materials, etc. They may also be used for protectively coating impervious articles, such as metals, or for coating or coating-and-impregnating articles, such as cloth, glass fibers in felted woven or other form, concrete, linoleum, synthetic boards, etc. These new synthetic bodies can also be used in making laminated, fibrous sheet materials wherein superimposed layers of cloth, paper, etc. are firmly bonded together with the synthetic body by the application of heat and pressure.

The following examples illustrate the best modes presently known to me for practicing the principles of my invention:

Example 1

[A blank for comparison with Examples 2 and 3.]

An unsaturated polyester was prepared by the solvent method from the following ingredients:

| | Moles |
|---|---|
| Propylene glycol | 1.1 |
| Maleic anhydride | 0.5 |
| Phthalic anhydride | 0.5 |

At an acid number of 40, the azeotrope solvent (xylol) was removed by vacuum distillation and the polyester resin dissolved in 50% styrene monomer. The solution was approximately at spraying consistency (20 seconds No. 4 Ford Cup). The mixture was catalyzed with 2% benzoyl peroxide (by weight) and was sprayed promptly on a steel panel. After a 30-minute cure at 250° F., the surface of the film had failed to cure and was tacky. An additional hour of baking at the same temperature also failed to eliminate the undesirable tack. It was noted that the coating exhibited excessive tackiness while hot. On being cooled, the polyester possessed less pronounced surface tack, but still lacked surface hardness and abrasion resistance.

Example 2

[Incorporation of the allylic ether component into the polyester]

A polyester similar to the one mentioned in Example 1 was prepared except that 50% of the propylene glycol was replaced with the mono-alpha allyl ether of glycerine,

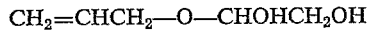

$$CH_2=CHCH_2—O—CHOHCH_2OH$$

The ratios used were as follows:

| | |
|---|---|
| α-Allyl ether of glycerine | 0.5 moles plus 10% excess. |
| Propylene glycol | 0.5 moles plus 10% excess. |
| Maleic anhydride | 0.5 moles. |
| Phthalic anhydride | 0.5 moles. |

The above polyester was prepared by the solvent method to an acid number of 45. It was then dissolved in an amount of styrene monomer corresponding to 50% by weight of the polyester. As in Example 1, this polyester-styrene system was at spraying consistency. On catalysis with 1% benzoyl peroxide and a curing schedule of 30 minutes at 250° F., the composition yielded an extremely glossy coating with remarkable hardness (3–4H Pencil Hardness) with good abrasion resistance and satisfactory adhesion to metal. There was no surface tack at the elevated temperature of 250° F. signifying no inhibition by oxygen of the air, and complete curing of the resin at its exposed surfaces. Small amounts of added cobalt of manganese naphthenate driers are capable of accelerating the cure of exposed surfaces in the early stages of curing. In some instances, such driers induce the formation of a film at the exposed surfaces of thick resinous masses while the interior remains liquid. Subsequently, the entire mass becomes cured to a hard resinous body.

*Example 3*

The following polyester was prepared:

α-Allyl ether of glycerine of
Example 2_____ 0.25 moles plus 10% excess.
Propylene glycol_____ 0.75 moles plus 10% excess.
Maleic anhydride_____ 0.5 moles.
Phthalic anhydride_____ 0.5 moles.

At an acid number of 45, the polyester was dissolved in 30% styrene monomer, catalyzed with 0.2% tertiary butyl hydroperoxide and ¼ liquid ounce per gallon of manganese naphthenate. The catalyzed mixture was poured into an aluminum dish and cured for 1 hour at 135° F., followed by another hour at 250° F. The mixture copolymerized to a hard, infusible mass with a non-tacky surface at elevated or room temperature. It was also characterized with remarkable abrasion resistance.

The same polyester mixture as employed in Example 3 was used to make glass fiber laminates and to impregnate porous alloy castings; and was used in low-pressure molding operations and in preparing putties and caulking compounds. In all such operations, whenever any portion of the resinous composition was exposed to the atmosphere, that portion was thoroughly cured, showing no surface tack at elevated or at room temperature.

*Example 4*

To 140 parts by weight of the unsaturated polyester of Example 1 was added 60 parts of 1,2,3-tris alpha allyl ether of propane and 2 parts of benzoyl peroxide. The solid polyester and the peroxide dissolved readily in the allylic ether component, and by curing the resulting solution in air for ½ hour at 250° F. followed by an additional ½ hour at 250° F., a hard resinous mass was secured having no tacky surface while hot.

*Example 5*

The 60 parts of tris alpha allyl ether of propane of Example 4 were replaced with 60 parts of di alpha allyl ether of polypropylene glycol (mol. wt. about 200), and the resulting solution was cured in the same manner as given in Example 4. The resulting casting possessed medium hardness and was somewhat flexible, and was free of surface tack when hot.

From the foregoing description of the invention, it will be understood that the problem of overcoming a tacky surface which has heretofore developed when modified and un-modified unsaturated alkyd resins are cured while exposed to air or oxygen is a problem which is quite general as far as such classes of compositions are concerned. The problem can be overcome, of course, by effecting the cure in the absence of oxygen, as by using a nitrogen or carbon monoxide atmosphere, but this solution of the problem is not very satisfactory commercially. In a few instances, the problem can be overcome to some extent solely by formulation of the copolymerizable composition, but such formulations have been found to have very restricted utility. The bulk of the unsaturated alkyd resins of the prior art, and of the polyesters which are modifications of such unsaturated alkyds, give rise to the problem when alone, or when combined with ethylenically-unsaturated monomers to produce 100% polymerizable compositions. Accordingly, the present invention can be applied to overcome the problem wherever such problem is encountered in 100%-polymerizable compositions of the types mentioned.

It will also be understood that the alpha allylic ether component of the present invention, while undergoing the normal 1,2 addition reaction with the unsaturated alkyd and/or with the ethylenically-unsaturated monomer, also apparently undergoes an autoxidation reaction which forms a surface film capable of preventing air or oxygen from inhibiting thorough curing of exposed surfaces of the mass. It is my discovery of this latter unobvious and unexpected result which constitutes the basis of the present invention. In my investigations I have found that any of the alpha allylic ethers described hereinabove can be used.

It will be understood that a multitude of combinations of ingredients both in the unsaturated alkyd resins or polyesters per se as well as in the final copolymerizable composition is possible. Moreover, those skilled in the art will recognize that variations otherwise than in formulation are also possible. Hence it should be appreciated that particular exemplification of even the main types or classes of variants within the principles of my invention would merely duplicate what those skilled in the art are already familiar with. Once recognition is had of the herein-disclosed effects of incorporating in the polymerizable or copolymerizable composition an alpha allylic ether of the class described, then the principles of the invention are believed to be fully illustrated by the foregoing examples, and to be fully described by the foregoing discussion of the broad aspects of the invention. In view thereof, it is believed that the scope of the invention is properly ascertainable from each of the following claims.

This application is a continuation-in-part of my copending application Serial No. 307,703, filed September 3, 1952, now abandoned.

Having now described my invention, what I claim is:

1. A liquid composition adapted for polymerization to a fully cured condition in the presence of air, said composition comprising as the sole film-forming vehicle thereof a homogeneous, 100%-polymerizable, liquid phase composed essentially of: (A) polymerizable ethylenically-unsaturated alkyd resin prepared from saturated dihydric aliphatic alcohol, dicarboxylic acid of 2 to 18 carbons free of non-benzenoid unsaturation in an amount sufficient to provide up to 90 mol percent of the total dicarboxylic acid radicals in said alkyd resin, and alpha unsaturated alpha, beta dicarboxylic acid, in esterified combination with at least one hydroxylated compound having up to two alcoholic hydroxyls available for effecting said esterified combination, said hydroxylated compound being an alkenyl ether of a saturated aliphatic polyhydric alcohol having up to 6 carbon atoms, the alkenyl radical containing up to 6 carbon atoms and having an olefinic linkage between the beta and gamma carbon atoms, the gamma carbon atom being part of a terminal methylene group and the beta carbon atom being linked directly to a carbon atom having an ethereal oxygen atom linked directly thereto, and said hydroxylated compound being present in an amount sufficient to provide a ratio of olefinic double bonds in said alkenyl radical to original double bonds of said alpha unsaturated alpha, beta dicarboxylic acid between 1:50 and 2:1; and (B) up to 70% by weight of said composition of compatible, liquid, monomeric, copolymerizable ethylenically-unsaturated hydrocarbon functioning as copolymerizable solvent for said alkyd resin.

2. A composition as claimed in claim 1 wherein the copolymerizable hydrocarbon solvent amounts to about 20–50%.

References Cited in the file of this patent
UNITED STATES PATENTS

| | | |
|---|---|---|
| 2,280,242 | Kropa et al. | Apr. 21, 1942 |
| 2,399,214 | Evans et al. | Apr. 30, 1946 |
| 2,448,258 | Evans et al. | Aug. 31, 1948 |
| 2,496,234 | Robie | Jan. 31, 1950 |

OTHER REFERENCES

Dannenburg et al.: "Industrial and Engineering Chemistry," August 1944, pages 1709–1711.